United States Patent Office 3,555,379
Patented Jan. 12, 1971

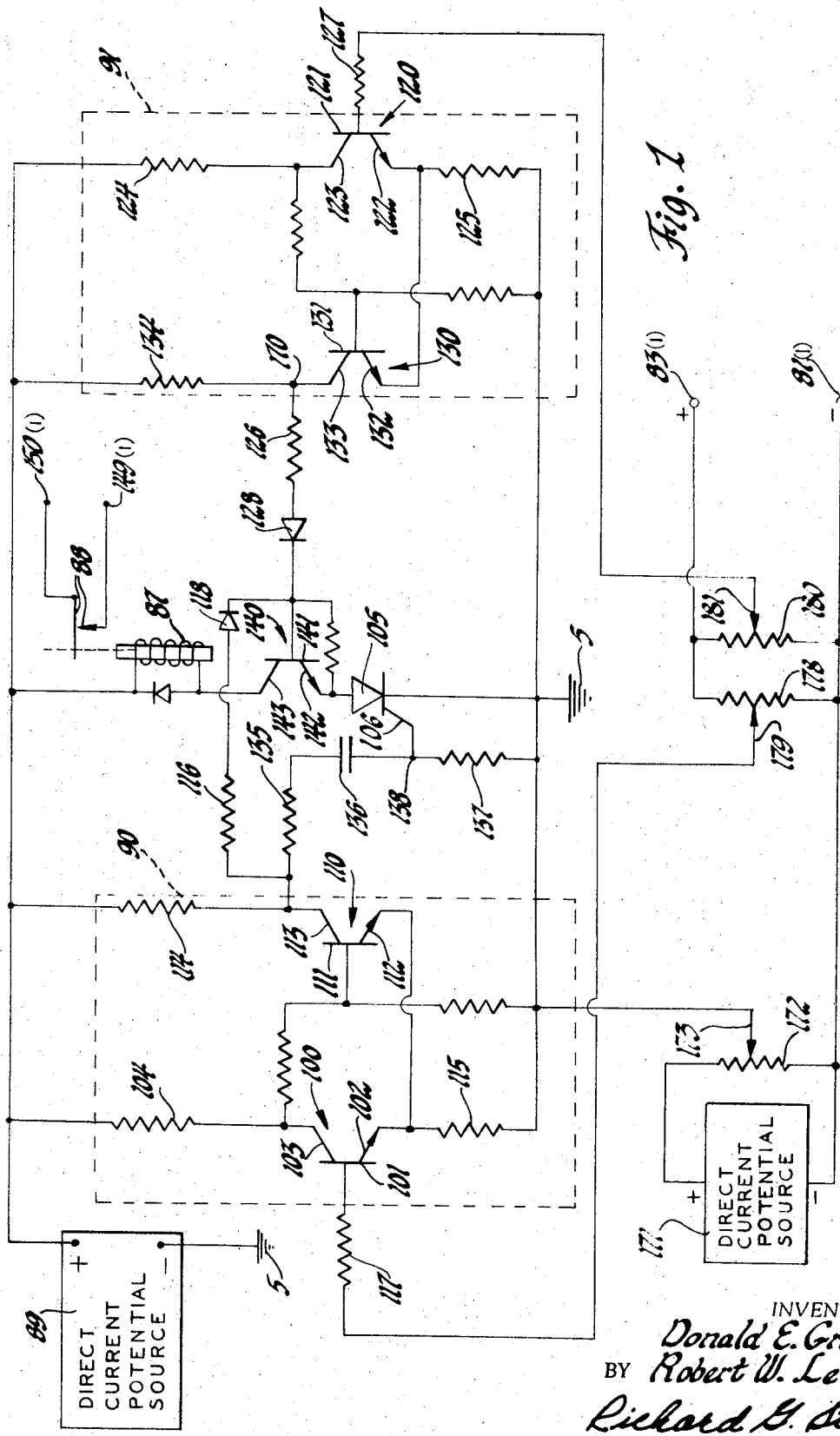

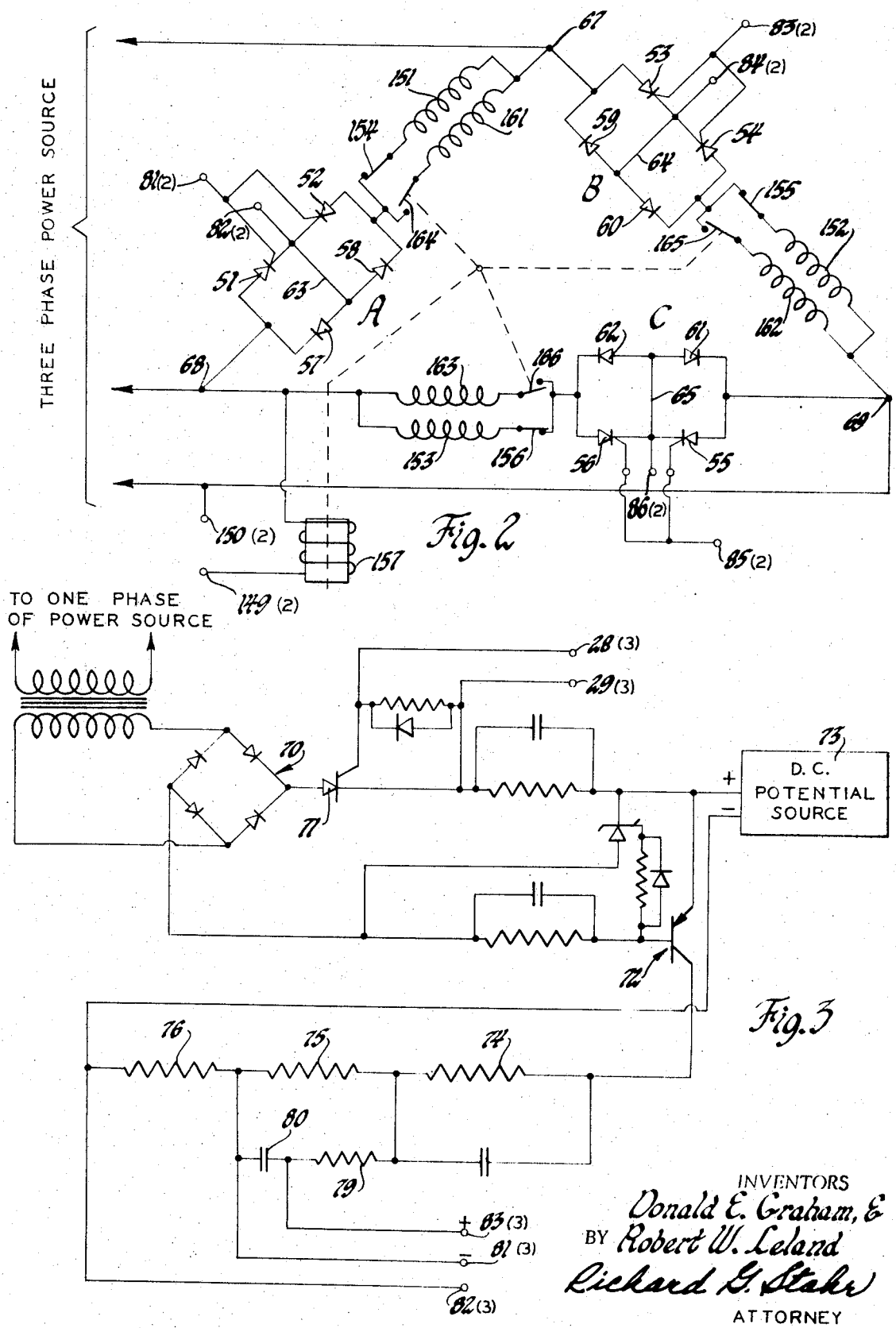

3,555,379
SYSTEM FOR OPERATING TWO OR MORE
ALTERNATING CURRENT INDUCTION
MOTORS IN PARALLEL
Donald E. Graham, Dayton, and Robert W. Leland, Kettering, Ohio, assignors to General Motors Corporation, Detroit, Mich., a corporation of Delaware
Filed May 22, 1968, Ser. No. 731,217
Int. Cl. H02p 1/54
U.S. Cl. 318—101                                                9 Claims

ABSTRACT OF THE DISCLOSURE

A system for automatically connecting a second alternating current induction motor in parallel with a first operating alternating current induction motor across a compatible alternating current supply potential in response to an external demand. The parallel combination of a phase winding of both motors is connected in series with a network of two series connected, oppositely poled silicon controlled rectifiers connected in parallel with two series connected, oppositely poled diodes electrically connected at the junction. Electrical trigger signals, produced by a speed control circuit, are applied across the gate-cathode electrodes of both silicon controlled rectifiers of each network during each potential half cycle. A switching circuit, responsive to operating motor load, energizes a relay which completes an energizing circuit for the starting contactor of the second motor and deenergizes the relay to remove the second motor when the demand no longer exists.

---

Figure 4:
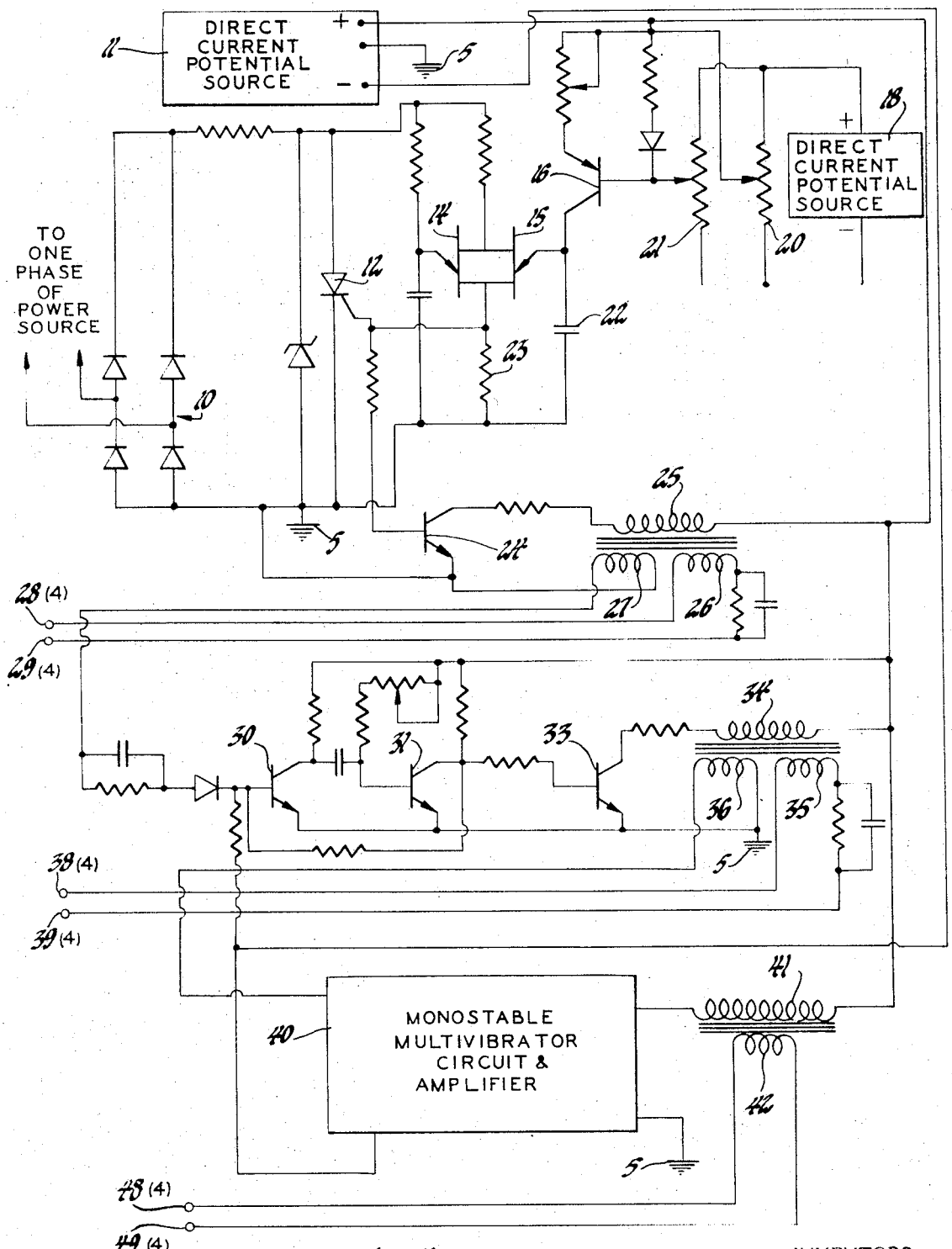

This invention relates to a system for operating a plurality of alternating current induction motors in parallel and, more specifically, to a system of this type wherein a second motor is automatically connected in parallel with a first operating motor in response to an external demand and the speed of both motors is controlled with a common speed control circuit.

With certain applications, it may be desirable to operate a single induction motor with normal demand conditions and to add an additional motor or motors with increased demand conditions. To eliminate or greatly reduce the supervision required for applications of this type, a motor control system which will automatically connect a second motor in parallel with a first operating motor in response to an external demand and which will control the speed of both motors with a common speed control circuit is desirable.

It is, therefore, an object of this invention to provide an improved system for operating two or more alternating current induction motors.

It is another object of this invention to provide an improved system for operating two or more alternating current induction motors of the type which will automatically connect a second motor in parallel with a first operating motor across a compatible alternating current supply potential source in response to an external demand and will control the speed of both motors with a common speed control circuit.

In accordance with this invention, a system for operating two or more alternating current induction motors is provided wherein a circuit responsive to an external demand establishes an energizing circuit for the operating coil of the starting contactor which connects a second motor in parallel with a first operating motor and the speed of both motors is controlled by a common speed control circuit which produces trigger signals at the electrical angle of each potential half cycle of each phase of the alternating current supply potential as determined by the external demand which are applied across electrical trigger signal sensitive switching devices to complete an energizing circuit for the respective phase windings of either or both motors across a compatible alternating current supply potential source.

For a better understanding of the present invention, together with additional objects, advantages and features thereof, reference is made to the following description and accompanying drawings in which:

FIG. 1 is a schematic diagram of a circuit for automatically connecting a second alternating current induction motor in parallel with a first operating alternating current induction motor in response to an external demand, FIG. 2 is a circuit arrangement for establishing an energizing circuit for each phase winding of an alternating current induction motor connected across a compatible alternating current supply potential source in response to an electrical trigger signal occurring during each potential cycle of each phase of the supply potential, FIG. 3 is a schematic diagram of a source of direct current control potential of a magnitude proportional to the load upon the operating motor which may be used in the system of this invention and, FIG. 4 is a schematic diagram of a speed control circuit of the type which produces an electrical trigger signal at the electrical angle of each potential half cycle of each phase of the alternating current supply potential as determined by the external demand which may be used with the system of this invention.

As the point of ground or reference potential is the same point electrically throughout the system, it has been illustrated by the accepted symbol and referenced by the numeral 5 throughout the drawings.

One example, and without intention or inference of a limitation thereto, of an application with which the system of this invention may be advantageously employed is a water system where it is important that a constant pressure be maintained. During normal or low demand conditions, the necessary pressure may be maintained by a single motor operating at a reduced speed driving a pump. With increased demand, the speed of the motor may be increased to drive the pump faster to meet the increased demand. An additional increase of demand which requires more pumping capacity than a single motor and pump is capable of delivering may require that another motor and pump be added to the system and the speed of both motors adjusted to meet the current demand.

The system of this invention includes the combination of a speed control circuit, FIG. 4, of the type which produces an electrical trigger signal at the electrical angle of each potential half cycle of each phase of the alternating current supply potential as determined by external demand for controlling the speed of induction motors; a circuit arrangement, FIG. 2, for establishing an energizing circuit for each phase winding of each induction motor across a phase of a compatible alternating current supply potential source in response to the electrical trigger signals produced by the speed control circuit; a source of direct current control potential, FIG. 3, of a magnitude proportional to the load upon the first operating motor and a circuit responsive to the external demand, FIG. 1, for connecting a second motor in parallel with the first operating motor.

One example of a speed control circuit which produces a trigger signal at the electrical angle of each potential half cycle of each phase of the supply potential for controlling motor speed which may be used with the system of this invention is schematically set forth in FIG. 4.

One phase of the power source may be connected to the alternating current input circuit terminals of a diode bridge type rectifier 10 for producing a source of direct current reference potential in synchronism with the reference phase which is applied across the anode-cathode electrodes of silicon controlled rectifier 12 and the base electrodes of unijunction transistors 14 and 15 to forward pole the current carrying electrodes of these devices. Connected across a separate direct current potential source 18 is a resistance bridge type circuit comprising potentiometer 21, which may be a device which will produce a change of resistance across the movable contact and the end terminals in response to an external influence such as a conventional pressure transducer of the type in which the movable contact is operated with changes of pressure, and a potentiometer 20, which may be a calibrated potentiometer of conventional design. The movable contacts of these devices are connected across the emitter-base electrodes of type PNP transistor 16, the emitter-collector electrodes of which are connected across another separate direct current potential source 11. A change of pressure will produce a potential drop across the movable contacts of the resistance bridge circuit of a magnitude proportional to the degree of change and in a direction to forward bias the emitter-base electrodes of transistor 16. Conduction of transistor 16 establishes a charging circuit for capacitor 22 across direct current potential source 11 which charges at a rate determined by the degree of bridge imbalance. When capacitor 22 has become charged to the peak point potential of unijunction transistor 15, this device switches to its low resistance state to provide a discharge circuit for capacitor 22. The current flow resulting from the discharge of capacitor 22 produces a potential signal across resistor 23 which is of a positive polarity at the end connected to the base of unijunction transistor 15. This potential signal is the first trigger signal and is produced at the electrical angle of each potential half cycle of the reference phase of the alternating current supply potential as determined by the magnitude of bridge imbalance. As bridge imbalance is a function of external demand, the electrical angle at which this signal is produced is determined by external demand. The trigger signal appearing across resistor 23 may be amplified by a transistor 24 which is triggered conductive by the application of this signal across the base-emitter electrodes thereof. The resulting current flow through primary winding 25 of a pulse transformer induces a potential in each of secondary windings 26 and 27. The amplified trigger signal induced in secondary winding 26 may be applied to external circuitry through terminals 28(4) and 29(4). The amplified trigger signal induced in the secondary winding 27 is applied across the base-emitter electrodes of transistor 30, which is the control transistor of a monostable multivibrator circuit, to switch this device conductive. As transistor 30 is switched conductive, the other transistor 31 of the multivibrator circuit is switched nonconductive to place the monostable multivibrator in the alternate state and a trigger signal appears across transistor 31 which may be amplified by transistor 33. At the conclusion of a period of time which is determined by the timing circuit network, the multivibrator spontaneously returns to its original stable state of operation with transistor 31 conducting and transistor 30 not conducting. With transistor 31 conducting, substantially ground potential is placed upon the base-emitter electrodes of transistor 33 which biases this device nonconductive. The resulting collapsing magnetic field in primary winding 34 of a pulse transformer induces an amplified trigger signal in secondary windings 35 and 36. The amplifier trigger signal induced in secondary winding 35 may be applied to external circuitry through terminals 38(4) and 39(4). The amplified trigger signal in secondary winding 36 is applied across the base-emitter electrodes of the control transistor of a second monostable multivibrator and amplifier circuit 40 which, since it is identical to the monostable multivibrator and amplifier circuit just described, has been shown in block form for the purpose of reducing drawing complexity. Upon the collapse of the magnetic field of primary winding 41 of a pulse transformer as the monostable multivibrator of circuit 40 returns to its stable state, an amplified trigger signal is induced in secondary winding 42 which may be applied to external circuitry through terminals 48(4) and 49(4). For three phase applications, the delay designated into the timing circuitry of each of the two monostable multivibrator circuits is of sufficient duration to separate the respective trigger signals by 120 electrical degrees.

A circuit arrangement for establishing an energizing circuit for each phase winding of an alternating current induction motor across a phase of a compatible alternating current supply potential source in response to electrical trigger signals occurring during each potential half cycle of each phase of the alternating current supply potential source is set forth in FIG. 2.

A network of two series connected and oppositely poled silicon controlled rectifiers having anode, cathode and control electrodes connected in parallel with two series connected and oppositely poled diodes having an electrical connection across the junctions between the silicon controlled rectifiers and the diodes is provided for each phase winding of the motor. If two or more motors are to be connected across the potential source, the parallel combination of a phase winding of all motors connected in series with one of these networks is connected across each phase of the alternating current supply potential. With three phase applications, three networks, identified by the letters A, B and C in FIG. 2, are required. The oppositely poled silicon controlled rectifiers of each network are referenced by the numerals 51 and 52; 53 and 54 and 55 and 56, respectively, and are shown to be connected cathode to cathode in each network. Therefore, the oppositely poled diodes in each network must be connected anode to anode and are referenced by the numerals 57 and 58; 59 and 60 and 61 and 62, respectively. In the event the oppositely poled silicon controlled rectifiers are connected anode to anode, the oppositely poled diodes would, of course, be connected cathode to cathode. The junctions between each silicon controlled rectifier and diode pair are electrically interconnected through respective leads 63, 64 and 65. The various connections to and the operation of this arrangement will be explained in detail later in this specification.

For a delta motor connection, as shown in FIG. 2, one series combination of one network and a motor phase winding is connected across each phase of the alternating current supply potential source. With the addition of more motors, a phase winding of each is connected in parallel with a respective phase winding of the other motors and the parallel combination of the motor phase windings connected in series with the corresponding network are connected across each phase of the alternating current supply potential source, as is shown in FIG. 2. To connect the motors in a Y configuration, two series combinations of one network and the motor phase windings in parallel would be connected across each phase of the alternating current supply potential source.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control signal of a polarity which is positive in respect to the potential present upon the cathode electrode and of sufficient magnitude to produce control electrode-cathode, or gate, current.

Initially, current flow through the silicon controlled rectifier is concentrated within a small area which expands with time until current flows across substantially the entire conductive area of the device. Therefore, when a silicon controlled rectifier is switched into loads which permit an extremely rapid rise of load current, the silicon controlled rectifier may break down because of the excessive current flow through the initially small conductive area, thereby destroying the device. This is particularly true of power silicon controlled rectifiers employed to switch considerable inrush or initial current which are triggered to conduction by relatively weak control signal pulses.

One method of preventing the destruction of a power silicon controlled rectifier switching into high $di/dt$ loads is to provide a control signal in the form of a direct current pulse which rapidly rises to a level of sufficient magnitude to rapidly expand the area of conduction to a degree sufficient to safely carry the load current.

A circuit, as schematically set forth in FIG. 3, which will produce the desirable fast rise time direct current pulse in response to each trigger signal produced by the speed control circuit of FIG. 4, may be provided for each silicon controlled rectifier pair.

The respective phase of the power source may be rectified by a full-wave diode bridge rectifier 70 which may be transformer coupled thereto. The direct current output potential of rectifier 70 is applied, through a silicon controlled rectifier 71, across the emitter-base electrodes of a type PNP transistor 72, the emitter-collector electrodes of which are connected across the positive and negative polarity terminals, respectively, of another direct current potential source 73 through a voltage divider network comprising series connected resistors 74, 75 and 76. The gate-cathode electrodes of silicon controlled rectifier 71 are connected across the end terminals of secondary windings 26 of FIG. 4 through input circuit terminals 28(3) and 29(3) which are electrically connected to respective output terminals 28(4) and 29(4) of FIG. 4. The amplified trigger signal appearing across secondary winding 26 of FIG. 4 is of the proper polarity relationship to produce gate current flow through silicon controlled rectifier 71 to trigger this device conductive until the output potential of rectifier 70 goes to zero at the end of each half cycle of the respective phase. With silicon controlled rectifier 71 conducting, the direct current potential of diode bridge 70 is impressed across the emitter-base electrodes of forward poled type PNP transistor 72 in the proper polarity relationship to establish emitter-base current flow and, consequently, emitter-collector conduction through a type PNP transistor. Conducting transistor 72 completes an energizing circuit for the voltage divider network of series connected resistors 74, 75 and 76 across direct current potential source 73. As silicon controlled rectifier 71 remains conductive until the direct current output potential of rectifier bridge 70 goes to zero at the end of each half cycle of the respective phase of the power source, transistor 72 remains conductive for the same period of time, consequently, a potential signal appears across the voltage divider network with the occurrence of each trigger signal produced by the speed control circuit of FIG. 4 and remains for the remainder of the half cycle until silicon controlled rectifier 71 is extinguished to interrupt the emitter-base electrode circuit of transistor 72 which extinguishes this device. The signal produced across resistor 76 with each trigger signal appearing across secondary winding 26 of FIG. 4 appears across output terminals 81(3) and 82(3) which may be electrically connected to input terminals 81(2) and 82(2), respectively, of FIG. 2. These signals trigger the one of silicon controlled rectifiers 51 or 52 which is forward poled across the anode-cathode electrodes thereof at the occurrence of the trigger signal during each potential half cycle of the reference phase. The input terminals of two other identical fast rise time pulse producing circuits may be connected to respective output terminals 38(4) and 39(4) and 48(4) and 49(4) of FIG. 4 and the output terminals of each corresponding to output terminals 81(3) and 82(3) may be electrically interconnected with the respective terminals 83(2) and 84(2) and 85(2) and 86(2) of the remaining two networks of FIG. 2. In this manner, the trigger signals produced during each potential half cycle of each phase of the supply potential source by the speed control circuit of FIG. 4 are applied across the control-cathode electrodes of both silicon controlled rectifiers of the network connected across the corresponding phase of the supply potential.

Referring to FIG. 2, phase winding 151 of the operating motor may be connected across one phase of the alternating current supply potential source through terminal 67, contacts 154, the network A and terminal 68, phase winding 152 of the operating motor may be connected across another phase through terminal 69, contacts 155, network B and terminal 67 and phase winding 153 of the operating motor may be connected across the third phase through terminal 68, contacts 156, network C and terminal 69.

Contacts 154, 155 and 156 may be of a conventional three phase induction motor starting contactor or a manually operated switch or any other similar device which is suitable for effecting the connection of a three phase alternating current induction motor across a three phase alternating current supply source.

To establish similar connections for the phase windings of the second motor, a starting contact having a pair of normally open contacts for each phase winding of the second motor and an operating coil may be employed. This device is schematically represented as normally open contacts 164, 165 and 166 all operated to close upon the energization of operating coil 157.

Phase winding 161 of the second motor may be connected across one phase of the alternating current supply potential source upon the energization of operating coil 157 through terminal 67, contacts 164 of the starting contactor, network A and terminal 68; phase winding 162 of the second motor may be connected across another phase through terminal 69, contacts 165 of the starting contactor, network B and terminal 67 and phase winding 163 of the second motor may be connected across the third phase through terminal 68, contacts 166 of the contactor, network C and terminal 69. One phase of the alternating current supply potential may serve as a source of energizing potential for operating coil 157 of this three phase contactor.

Assuming that the potential upon terminal 67 is of a positive polarity with respect to that present upon terminal 68, upon the occurrence of a trigger signal, forward poled silicon controlled rectifier 52 is triggered conductive to complete an energizing circuit for motor winding 151 across one phase of the supply potential which may be traced from terminal 67, through winding 151, contacts 154, conducting silicon controlled rectifier 52, lead 63 and forward poled diode 57 to terminal 68. Should the potential present upon terminal 68 be of a positive polarity with respect to that present upon terminal 67 upon the occurrence of a trigger signal, forward poled silicon controlled rectifier 51 is triggered conductive to complete an energizing circuit for phase winding 151 across the same phase of the supply potential which may be traced from terminal 68, through conducting silicon controlled rectifier 51, lead 63, forward poled diode 58, contacts 154 and phase winding 151 to terminal 67. Similar energizing circuits for each of phase windings 152 and 153 may be traced between terminals 67 and 69 and 68 and 69. From this description it is apparent that the silicon controlled rectifiers of the respective networks are responsive to the trigger signals produced by the speed control circuit to complete an energizing circuit through the corresponding motor phase windings during each potential half cycle of the respective phases of the alternating current supply potential.

It may be well to note that, with the networks connected as shown in FIG. 2, the reverse potential drop across any of the silicon controlled rectifiers never exceeds the potential drop across the corresponding diode and the silicon controlled rectifiers carry phase current rather than line current, permitting the use of silicon controlled rectifiers of smaller reverse potential and lower current ratings than would normally be required in a similar application, and both silicon controlled rectifiers of each network may be triggered from the same trigger signal source.

As has previously been brought out, the trigger signals are produced by the speed control circuit at the electrical angle of each potential half cycle of each phase of the alternating current supply potential source as determined by external demand. The earlier during each potential cycle that these trigger signals are produced, the greater is the speed of the motor as the windings are energized over a greater portion of each potential cycle since the respective silicon controlled rectifiers are conductive over a greater electrical angle of each potential cycle.

A speed control circuit identical to that schematically set forth in FIG. 4 is disclosed and described in detail in a copending application Ser. No. 722,637, filed Apr. 19, 1968, now Pat. No. 3,506,899, and a similar speed control circuit, upon which the speed control circuit of FIG. 4 is an improvement, is disclosed and described in detail, including a detailed vector analysis of the potential relationships across the several phase windings over each potential cycle of each phase of the alternating current supply potential, in another corresponding application Ser. No. 493,652, filed Oct. 7, 1965, both of which are assigned to the assignee of the present invention.

As the speed of the first operating motor is determined by the load thereupon, one of the fast rise time direct current pulse producing circuits as schematically set forth in FIG. 3 may be employed as the source of control potential of a magnitude proportional to the load upon the first motor. The potential drop across resistor 75 of the voltage divider network is averaged by the series combination of resistor 79 and capacitor 80 and appears across capacitor 80 as a direct current potential of a magnitude substantially equal to the average potential across resistor 75. As current flow through the potential divider network is initiated with each trigged signal and is sustained through the remainder of the potential half cycle and since, for increasing motor speeds with increasing loads thereupon, the speed control circuit of FIG. 4 produces the trigger signals earlier during each potential cycle, the magnitude of the potential across capacitor 80 increases with motor speed and, consequently, motor load. Therefore, the magnitude of the potential across capacitor 80 is proportional to motor load and may be employed as the direct current control potential.

The circuit for automatically connecting a second alternating current induction motor in parallel with a first operating alternating current induction motor across a compatible alternating current supply potential source in response to an external demand is schematically set forth in FIG. 1.

This circuit includes an electrical relay having an operating coil 87 and a pair of normally open contacts 88, a source of direct current operating potential 89 and first and second trigger circuits shown within respective dashed rectangles 90 and 91, each having a normally "off" control transistor having base, emitter and collector electrodes and a normally "on" follower transistor having base, emitter and collector electrodes and being of the type which are transferrable from a stable state to an alternate state with the presence of a potential difference greater than a selected magnitude across the emitter-base electrodes of the respective control transistors and a switching circuit responsive to the transfer of one of the trigger circuits to the alternate state for establishing an energizing circuit for the operating coil 87 of the electrical relay across source of direct current operating potential 89 and to the transfer of the other one of the trigger circuits to the stable state for interrupting the energizing circuit.

Trigger circuits 90 and 91 may be conventional Schmitt trigger circuits as shown in FIG. 1.

The Schmitt trigger circuit is essentially a bistable device having a nonconductive control transistor and a conductive follower transistor in the initial state and a conductive control transistor and a nonconductive follower transistor in the alternate state which may be triggered or transferred to the alternate state while a potential difference of a preselected magnitude and of the proper polarity is maintained across the base-emitter electrodes of the control transistor and which returns to the initial state upon the removal of or the decrease below the selected magnitude of the potential appearing across the base-emitter electrodes of the control transistor.

The Schmitt trigger circuit differs from the conventional bistable multivibrator in that one of the coupling networks is replaced by a common emitter resistor. In the initial state and in the absence of an input signal, there is no potential applied across the base-emitter electrodes of the control transistor, consequently, the control transistor is not conducting and the collector potential thereof is substantially equal to supply potential. The control transistor collector potential is coupled to the base electrode to the follower transistor as a forward base-emitter bias through a resistor. The resulting follower transistor emitter current flow through the common emitter resistor produces and maintains a reverse emitter bias upon the emitter electrode of the control transistor. This reverse bias developed across the emitter and base electrodes of the control transistor maintains this device cut-off while the high forward bias present upon the base-emitter junction of the follower transistor produces conduction therethrough in the saturation region. An input signal of sufficient amplitude and proper polarity relationship applied across the base-emitter electrodes of the control transistor will overcome the reverse emitter bias thereon to produce conduction therethrough. Upon the conduction of the control transistor, the potential upon the collector electrode thereof decreases in magnitude, a change which is coupled to the base electrode of the follower transistor. Consequently, the follower transistor begins to conduct less with a resulting decrease of emitter current flow therethrough, a condition which lowers the potential across the common emitter resistor. Therefore, the emitter electrode of the control transistor becomes more forward biased, a condition which increases collector current. This regenerative action continues until the control transistor is conducting in the saturation region and the follower transistor is in a cut-off condition and the device has transferred to the alternate state. The alternate state continues until the potential impressed across the base-emitter electrodes of the control transistor becomes less of a forward bias, a condition which produces reduced collector-emitter current flow through the control transistor, consequently, the collector potential increases, the emitter current decreases and the potential across the common emitter resistor decreases. Simultaneously, the increasing collector potential of the control transistor, which is coupled to the base electrode of the follower transistor, begins to forward bias the base-emitter electrodes of the follower transistor which, coupled with the decreasing potential across the common emitter resistor, increases the forward bias across the base-emitter electrodes thereof. The combination of these actions reduces the reverse bias across the emitter-base junction of the follower transistor until it again operates in the saturation region to cut-off the control transistor and the device has transferred back to the first stable state.

Type NPN transistor 100 having the usual base 101, emitter 102 and collector 103 electrodes is the normally nonconductive control transistor and type NPN transistor 110 having the usual base 111, emitter 112 and collector 113 electrodes is the normally conducting follower transistor of trigger circuit 90 and type NPN transistor 120 having the usual base 121, emitter 122 and collector 123 electrodes is the normally non-conductive control transistor and type NPN transistor 130, having the usual base 131, emitter 132 and collector 133 electrodes is the normally conducting follower transistor of trigger circuit 91. The collector electrodes of each of transistors 100, 110, 120 and 130 are connected to the positive polarity terminal of the direct current operating potential source 89 through respective collector resistors 104, 114, 124 and 134. The emitter electrodes 102 and 112 of respective transistors 100 and 110 of trigger circuit 90 and emitter electrodes 122 and 132 of respective transistors 120 and 130 of trigger circuit 91 are connected to the negative polarity terminal of direct current operating potential source 89 through respective common emitter resistors 115 and 125, and point of reference or ground potential 5. Therefore, the collector-emitter electrodes of all of these type NPN transistors are forward poled.

The switching circuit which is responsive to the transfer of one of the trigger circuits to the alternate state for establishing an energizing circuit for operating coil 87 of the electrical relay and to the transfer of the other one of the trigger circuits to the stable state for interrupting the energizing circuit for operating coil 87 includes type NPN transistor 140 having the usual base 141, emitter 142 and collector 143 electrodes and a silicon controlled rectifier 105 having anode and cathode electrodes and a gate electrode 106. The electrical relay operating coil 87, the collector-emitter electrodes 143 and 142 of transistor 140, the anode-cathode electrodes of silicon controlled rectifier 105 are connected across the positive polarity output terminal of direct current operating potential source 89 and point of reference or ground potential 5. Therefore, the collector-emitter electrodes of type NPN transistor 140 and the anode-cathode electrodes of silicon controlled rectifier 105 are forward poled.

The collector electrode 113 of follower transistor 110 of trigger circuit 90 is connected to the base electrode 141 of switching transistor 140 through the series combination of resistor 116 and diode 118 and the collector electrode 133 of follower transistor 130 of trigger circuit 91 is connected to the base electrode 141 of switching transistor 140 through the series combination of resistor 126 and diode 128. Connected between collector electrode 113 of follower transistor 110 and the cathode electrode of silicon controlled rectifier 105 is the series combination of a resistor 135, a capacitor 136 and another resistor 137. The gate electrode 106 of silicon controlled rectifier 105 is connected to a junction 138 between capacitor 136 and resistor 137.

The control potential of a magnitude proportional to the load upon the first operating motor appearing across capacitor 80 of FIG. 3 is applied across the base-emitter electrodes of each of control transistor 100 and 120 of respective trigger circuits 90 and 91 through base resistors 117 and 127 and point of reference or ground potential 5 through input terminals 81(1) and 83(1) which are electrically connected to respective output terminals 81(3) and 83(3) of FIG. 3.

As it is extremely difficult to selectively change at will the trip point of a Schmitt trigger circuit, each of trigger circuits 90 and 91 are designed to transfer from the initial state to the alternate state with a potential difference of a predetermined magnitude impressed across the base-emitter electrodes of the respective control transistor 100 and 120. To provide for the transfer of these circuits with different magnitudes of control potential with different applications, provision is made to produce the predetermined potential difference magnitude across the base-emitter electrodes of each control transistor with different magnitudes of control potential and comprises a direct current potential source 171, a potentiometer 172 having a movable contact 173 connected across direct current potential source 171 and potentiometers 178 and 180 having respective movable contacts 179 and 181 connected across input terminals 81(1) and 83(1). A selected polarity terminal of direct current source 171 is connected to a like polarity terminal of the control potential source through terminal 81(1). The movable contact 173 of potentiometer 172 is connected to the emitter electrodes of both transistors of each trigger circuit through point of reference or ground potential 5 and respective emitter resistors 115 and 125, movable contact 179 of potentiometer 178 is connected to the base electrode 101 of control transistor 100 of trigger circuit 90 through base resistor 117 and movable contact 181 of potentiometer 180 is connected to the base electrode 121 of control transistor 120 of trigger circuit 91 through base resistor 127.

The potential appearing across movable contact 173 of potentiometer 172 and point of reference or ground potential 5 is in polarity opposition to the potential appearing across respective movable contacts 179 and 181 of potentiometers 178 and 180 and point of reference or ground potential 5. Therefore, the potential appearing across movable contact 173 and ground 5 is subtractive of the potential appearing across movable contacts 179 and 181 and ground 5. By adjusting movable contact 173, the same predetermined potential difference magnitude to be impressed across the base-emitter electrodes of the respective control transistor of each trigger circuit may be obtained for different magnitudes of control potential. For example, should the trigger circuits be designed to transfer the operating state with a one volt potential difference across the base-emitter electrodes of each control transistor and the devices are to transfer with a positive polarity five volts of control potential with respect to ground 5, movable contact 173 would be adjusted to provide a potential of four volts of a negative polarity with respect to ground 5. The difference potential across the base-emitter electrodes of both control transistors would then be one volt with a control potential of five volts.

Assuming that the first operating motor increases in speed in response to external demand as sensed by the motor speed control circuit circuitry of FIG. 4, the control potential appearing across capacitor 80 of FIG. 3 increases in magnitude. When the difference potential across movable contacts 181 and 173 equals the predetermined magnitude of potential difference across the base-emitter electrodes of control transistor 120 of trigger circuit 91, this device transfers to its alternate state in which follower transistor 130 is not conducting, consequently, the potential of junction 170 goes positive and is applied to the base electrode 141 of switching transistor 140. Although the potential relationship across the base-emitter electrodes of switching transistor 140 satisfies the requirement for base-emitter current flow through a type NPN transistor, this device does not conduct as silicon controlled rectifier 105 is also nonconductive to interrupt the collector-emitter circuit.

With a continued increase of speed of the operating motor, the magnitude of control potential continues to increase until the predetermined potential difference appears across the base-emitter electrodes of control transistor 100 of trigger circuit 90 to transfer this device to its alternate state with follower transistor 110 thereof not conducting. As follower transistor 110 goes nonconductive, substantially full-line potential is applied across capacitor 136. The initial charging current for capacitor 136 produces a potential drop across resistor 137 which is of a positive polarity at junction 138. As this potential drop is applied across the gate-cathode electrodes of silicon controlled rectifier 105 and is of the proper polarity relationship to produce gate current flow therethrough, this device goes conductive to establish the collector-emitter circuit for switching transistor 140 which goes conductive to complete an energizing circuit for the operating coil 87 of the electrical relay across the source of direct current operating potential 89 to close its normally open contacts.

Output terminals 149(1) and 150(1) are connected to input terminals 149(2) and 150(2) of FIG. 2, consequently, the movable contacts 88 of the electrical relay are connected in series with the operating coil 157 of the electrical contactor for the second motor and the source of energizing potential therefor which may be one phase of the supply potential. Upon the energization of operating coil 87 to close contacts 88, an energizing circuit is established for operating coil 157 which operates to close the associated normally open contacts 164, 165 and 166, FIG. 2, to connect each phase winding of the second motor in parallel with a phase winding of the first operating motor to place the two motors in parallel across the three phase power source.

As the external demand begins to be satisfied upon the operation of the second motor, the trigger signals are produced by the speed control circuit of FIG. 4 later during each potential cycle, consequently, the speed of the first motor begins to reduce while the speed of the second motor begins to increase until they stabilize at a constant speed which supplies the requirements of the external demand.

Assuming that the requirements of the external demand diminish, motor speed and, consequently, the magnitude of control potential also diminish until the magnitude of the potential difference across the base-emitter electrodes of control transistor 100 of trigger circuit 90 is less than the predetermined magnitude. At this time, trigger circuit 90 transfers to the initial state in which control transistor 100 is not conducting and follower transistor 110 is conducting. With follower transistor 110 conducting, capacitor 136 discharges through the collector-emitter electrodes thereof preparatory to producing the next potential spike across resistor 137 upon the next transfer of trigger circuit 90 from the first to the alternate state. As the external demand and, consequently, the magnitude of the control potential continues to decrease, the magnitude of the potential difference across the base-emitter electrodes of control transistor 120 of trigger circuit 91 becomes less than the predetermined magnitude. At this time, trigger circuit 91 transfers to the initial state in which follower transistor 130 is conducting and control transistor 120 is not conducting. Conducting follower transistor 130 removes the base drive circuit from switching transistor 140 to extinguish this device which, in turn, extinguishes silicon controlled rectifier 105 to interrupt the engergizing circuit of relay operating coil 87. As the relay operating coil 87 becomes deenergized, the normally open contacts 88 thereof open to interrupt the energizing circuit for operating coil 157 of the electrical contactor of FIG. 2 which permits the associated normally open contacts thereof to open and remove the second motor from the line and the system operates with one motor until the external demand again dictates a second motor be added to the system in a manner as has just been explained.

Throughout this specification, specific electronic circuitry, devices components, gating arrangements and electrical polarities have been set forth. It is to be specifically understood that alternative electronic circuitry, components, devices and gating arrangements having similar electrical characteristics and compatible electrical polarities may be substituted therefor.

While a preferred embodiment of the present invention has been shown and described, it will be obvious to those skilled in the art that various modifications and substitutions may be made without departing from the spirit of the invention which is limited only within the scope of the appended claims.

What is claimed is:

1. A circuit arrangement for establishing an energizing circuit for each phase winding of an alternating current induction motor across a respective phase of a compatible alternating current supply potential source in response to electrical trigger signals occurring during each potential half cycle of each phase of the supply potential comprising, a network of two series connected and oppositely poled silicon controlled rectifiers having anode, cathode and control electrodes connected in parallel with two series connected and oppositely oppositely poled diodes having an electrical connection across the junctions between said silicon controlled rectifiers and said diodes corresponding to each motor phase winding means for connecting each motor phase winding and the said network corresponding thereto in series across a respective phase of said alternating current supply potential source, and means for applying said electrical trigger signals occurring during each potential half cycle of each phase of said supply potential across said control-cathode electrodes of both said silicon controlled rectifiers in the said network connected in series with the said motor phase winding to which it corresponds across the phase of the supply potential during which said electrical trigger signals occur.

2. A circuit arrangement for connecting alternating current induction motors across a compatible alternating current supply potential source in addition to a first operating alternating current induction motor in response to an external demand comprising in combination with a starting contactor for each additional motor having a pair of electrical contacts for each phase winding thereof and an operating coil and circuitry responsive to the external demand for establishing respective energizing circuits for said operating coils, a network of two series connected and oppositely poled silicon controlled rectifiers having anode, cathode and control electrodes connected in parallel with two series connected and oppositely oppositely poled diodes having an electrical connection across the junctions between said silicon controlled rectifiers and said diodes for each phase of said alternating current supply potential, means for connecting a said pair of electrical contacts of a said starting contactor in series with each phase winding of a respective one of said additional motors, means for connecting the series combination of a phase winding and series connected contact pair of each one of said additional motors in parallel with a phase winding of said first operating motor and means for connecting each parallel combination of phase windings in series with a said network across each phase of said alternating current supply potential.

3. A circuit arrangement for connecting alternating current induction motors across a compatible alternating current supply potential source in addition to a first operating alternating current induction motor in respsonse to an external demand and controlling the speed of both motors with a common speed control circuit comprising in combination with a speed controll circuit of the type which produces an electrical trigger signal during each potential half cycle of each phase of the supply potential, a starting contactor for each additional motor having a pair of electrical contacts for each phase winding thereof and an operating coil and circuitry responsive to the external demand for establishing respective energizing circuits for said operating coils, a network of two series connected and oppositely poled silicon controlled rectifiers having anode, cathode and control electrodes connected in parallel with two series connected and oppositely oppositely poled diodes having an electrical connection across the junctions between said silicon controlled rectifiers and said diodes for each phase of said alternating current supply potential, means for connecting a said pair of electrical contacts of a said starting contactor in series with each phase winding of a respective one of said additional motors, means for connecting the series combination of a phase winding and series connected contact pair of each one of said additional motors in parallel with a phase winding of said first operating motor, means for connecting each parallel combination of phase windings in series with a said network across each phase of said alternating current supply potential and means for applying the respective said trigger signals produced by said speed control circuit across the said control-cathode electrodes of both said silicon controlled rectifiers of said network which is connected across the corresponding phase of said supply potential.

4. A circuit for automatically connecting a second alternating current induction motor in parallel with a first operating alternating current induction motor across a compatible alternating current supply potential source in response to an external demand comprising in combination with a starting contactor having a pair of electrical contacts for each phase winding of said second motor and an operating coil and a source of energizing potential therefor, means including a said pair of electrical contacts of said starting contactor connected in series with each phase winding of said second motor for connecting each phase winding of said second motor across a phase of said alternating current supply potential source, a source of direct current operating potential, an electrical relay having an operating coil and two normally open contacts, first and second trigger circuits each having a normally "off" control transistor having base, emitter and collector electrodes and a normally "on" follower transistor having base, emitter and collector electrodes connected across said source of direct current operating potential and being of the type which are transferrable from a stable state to an alternate state with the presence of a potential difference greater than a selected magnitude across the said emitter-base electrodes of said control transistor, switching circuit means responsive to the transfer of one of said trigger circuits to the said alternate state for establishing an energizing circuit for said operating coil of said electrical relay across said source of direct current operating potential and to the transfer of the other one of said trigger circuits to the said stable state for interrupting said energizing circuit, a source of direct current control potential of a magnitude proportional to the load upon said first motor, means for applying said source of direct current control potential across the said emitter-base electrodes of said control transistor of both said trigger circuits and means for connecting said relay contacts in series with said operating coil of said starting contactor and said source of energizing potential therefor.

5. A circuit for automatically connecting a second alternating current induction motor in parallel with a first operating alternating current induction motor across a compatible alternating current supply potential source in response to an external demand comprising in combination with a starting contactor having a pair of electrical contacts for each phase winding of said second motor and an operating coil and a source of energizing potential therefor, means including a said pair of electrical contacts of said starting contactor connected in series with each phase winding of said second motor for connecting each phase winding of said second motor across a phase of said alternating current supply potential source, a source of direct current operating potential, an electrical relay having an operating coil and two normally open contacts, first and second trigger circuits each having a normally "on" control transistor having base, emitter and collector electrodes and a normally "off" follower transistor having base, emitter and collector electrodes connected across said source of direct current operating potential and being of the type which are transferrable from a stable state to an alternate state with the presence of a potential difference greater than a selected magnitude across the said emitter-base electrodes of said control transistor, switching circuit means responsive to the transfer of one of said trigger circuits to the said alternate state for establishing an energizing circuit for said operating coil of said electrical relay across said source of direct current operating potential and to the transfer of the other one of said trigger circuits to the said stable state for interrupting said energizing circuit, a separate source of direct current potential, a source of direct current control potential of a magnitude proportional to the load upon said first motor, means for connecting a selected polarity terminal of said separate source of direct current potential to a like polarity terminal of said source of direct current control potential, a first potentiometer having a movable contact, means for connecting said first potentiometer across said separate source of direct current potential, means for connecting said movable contact of said first potentiometer to the said emitter electrodes of all of said transistors of said first and second trigger circuits, second and third potentiometers, means for connecting said second and third potentiometers in parallel across said source of direct current control potential, means for connecting said movable contact of one of said second and third potentimovable contact of the other of said second and third of said first trigger circuit, means for connecting said ometers to the said base electrode of said control transistor potentiometers to the said base electrode of said control transistor and said second trigger circuit and means for connecting said relay contacts in series with said operating coil of said starting contactor and said source of energizing potential therefor.

6. A circuit for automatically connecting a second alternating current induction motor in parallel with a first operating alternating current induction motor across a compatible alternating current supply potential source in response to an external demand comprising in combination with a starting contactor having a pair of electrical contacts for each phase winding of said second motor and an operating coil and a source of energizing potential therefor, means including a said pair of electrical contacts of said starting contactor connected in series with each phase winding of said second motor for connecting each phase winding of said second motor across a phase of said alternating current supply potential source, a source of direct current operating potential, an electrical relay having an operating coil and two normally open contacts, a switching transistor having base, emitter and collector electrodes, a silicon controlled rectifier having anode, cathode and control electrodes, means for connecting said relay operating coil, said collector-emitter electrodes of said switching transistor and said anode-cathode electrodes of said silicon controlled rectifier in series across said source of direct current operating potential, first and second trigger circuits each having a normally "on" control transistor having base, emitter and collector electrodes and a normally "off" follower transistor having base, emitter and collector electrodes connected across said source of direct current operating potential and being of the type which are transferrable from a stable state to an alternate state with the presence of a potential difference greater than a selected magnitude across the said emitter-base electrodes of said control transistor, first and second resistors, first and second diodes, means for connecting said first resistor and said first diode in series between said collector electrode of said follower transistor of said first trigger circuit and said base electrode of said switching transistor, means for connecting said second resistor and said second diode in series between said collector electrode of said follower transistor of said second trigger circuit and said base electrode of said switching transistor, a capacitor, third and fourth resistors, means for connecting said third resistor, said capacitor, and said fourth resistor in series between said collector electrode of said follower transistor of said first trigger circuit and said cathode electrode of said silicon controlled rectifier in that order, means for connecting said control electrode of said silicon controlled rectifier to a junction between said capacitor and said fourth resistor, a separate source of direct current potential, a source of direct current control potential of a magnitude proportional to the load upon said first motor, means for connecting a selected polarity terminal of said separate source of direct current potential to a like polarity terminal of said source of direct current control potential, a first potentiometer having a movable contact, means for connecting said first potentiometer across said separate source of direct current potential, means for connecting said movable contact of said first potentiometer to the said emitter electrodes of all of said transistors of said first and second trigger circuits, second and third potentiometers, means for connecting said second and third potentiometers in parallel across said source of direct current control potential, means for connecting said movable contact of one of said second and third potentiometers to the said base electrode of said control transistor of said first trigger circuit, means for connecting said movable contact of the other of said second and third potentiometers to the said base electrode of said control transistor of said second trigger circuit and means for connecting said relay contacts in series with said operating coil of said starting contactor and said source of energizing potential therefor.

7. A system for automatically connecting a second alternating current induction motor in parallel with a first operating alternating current induction motor across a compatible alternating current supply potential source in response to an external demand and controlling the speed of both motors with a common speed control circuit comprising in combination with a speed control circuit of the type which produces an electrical trigger signal during each potential half cycle of each phase of the supply potential, at least one starting contactor having a pair of electrical contacts for each phase winding of said second motor and an operating coil and a source of energizing potential therefor, the parallel combination of a phase winding of both said motors connected in series with a network of two series connected and oppositely poled silicon controlled rectifiers having anode, cathode and control electrodes connected in parallel with two series connected and oppositely oppositely poled diodes having an electrical connection across the junctions between said silicon controlled rectifiers and said diodes connected across each phase of said alternating current supply potential, means for connecting a said pair of electrical contacts of said starting contactor in series with each phase winding of said second motor, means for applying the respective said trigger signals produced by said speed control circuit across the said control-cathode electrodes of both said silicon controlled rectifiers of said network which is connected across the corresponding phase of said supply potential, a source of direct current operating potential, an electrical relay having an operating coil and two normally open contacts, first and second trigger circuits each having a normally "on" control transistor having base, emitter and collector electrodes and a normally "off" follower transistor having base, emitter and collector electrodes connected across said source of direct current operating potential and being of the type which are transferrable from a stable state to an alternate state with the presence of a potential difference greater than a selected magnitude across the said emitter-base electrodes of said control transistor, switching circuit means responsive to the transfer of one of said trigger circuits to the said alternate state for establishing an energizing circuit for said operating coil of said electrical relay across said source of direct current operating potential and to the transfer of the other one of said trigger circuits to the said stable state for interrupting said energizing circuit, a source of direct current control potential of a magnitude proportional to the speed of said first motor, means for applying said second source of direct current potential across the said emitter-base electrodes of said control transistor of both said trigger circuits and means for connecting said relay contacts in series with said operating coil of said starting contactor and said source of energizing potential therefor.

8. A system for automatically connecting a second alternating current induction motor in parallel with a first operating alternating current induction motor across a compatible alternating current supply potential source in response to an external demand and controlling the speed of both motors with a common speed control circuit comprising in combination with a speed control circuit of the type which produces an electrical trigger signal during each potential half cycle of each phase of the supply potential, at least one starting contactor having a pair of electrical contacts for each phase winding of said second motor and an operating coil and a source of energizing potential therefor, the parallel combination of a phase winding of both said motors connected in series with a network of two series connected and oppositely poled silicon controlled rectifiers having anode, cathode and control electrodes connected in parallel with two series connected and oppositely oppositely poled diodes having an electrical connection across the junctions between said silicon controlled rectifiers and said diodes connected across each phase of said alternating current supply potential, means for connecting a said pair of electrical contacts of said starting contactor in series with each phase winding of said second motor, means for applying the respective said trigger signals produced by said speed control circuit across the said control cathode electrodes of both said silicon controlled rectifiers of said network which is connected across the corresponding phase of said supply potential, a source of direct current operating potential, an electrical relay having an operating coil and two normally open contacts, first and second trigger circuits each having a normally "on" control transistor having base, emitter and collector electrodes and a normally "off" follower transistor having base, emitter and collector electrodes connected across said source of direct current operating potential and being of the type which are transferrable from a stable state to an alternate state with the presence of a potential difference greater than a selected magnitude across the said emitter-base electrodes of said control transistor, switching circuit means responsive to the transfer of one of said trigger circuits to the said alternate state for establishing an energizing circuit for said operating coil of said electrical relay across said source of direct current operating potential and to the transfer of the other one of said trigger circuits to the said stable state for interrupting said energizing circuit, a separate source of direct current potential, a source of direct current control potential of a magnitude proportional to the speed of said first motor, means for connecting a selected polarity terminal of said separate source of direct current potential to a like polarity terminal of said source of direct current control potential, a first potentiometer having a movable contact, means for connecting said first potentiometer across said separate source of direct current potential, means for connecting said movable contact of said first potentiometer to the said emitter electrodes of all of said transistors of said first and second trigger circuits, second and third potentiometers, means for connecting said second and third potentiometers in parallel across said source of direct current control potential, means for connecting said movable contact of one of said second and third potentiometers to the said base electrode of said control transistor of said first trigger circuit, means for connecting said movable contact of the other of said second and third potentiometers to the said base electrodes of said control transistor of said second trigger circuit and means for connecting said relay contacts in series with said operating coil of said starting contactor and said source of energizing potential therefor.

9. A system for operating two or more alternating current induction motors wherein each additional motor is automatically connected in parallel with a first operating motor across a compatible alternating current supply potential source in response to an external demand and the speed of all motors is controlled with a common speed control circuit comprising in combination with a speed control circuit of the type which produces an electrical trigger signal during each potential half cycle of each phase of the supply potential, a starting contactor for each additional motor having a pair of electrical contacts for each phase winding of said corresponding motor and an operating coil and a source of energizing potential therefor, the parallel combination of a phase winding of both said motors connected in series with a network of two series connected and oppositely poled silicon controlled rectifiers having anode, cathode and control electrodes connected in parallel with two series connected and oppositely oppositely poled diodes having an electrical connection across the junctions between said silicon controlled rectifiers and said diodes connected across each phase of said alternating current supply potential, means for connecting a said pair of electrical contacts of each said starting contactor in series with each phase winding of the corresponding said motor, means for applying the respective said trigger signals produced by said speed control circuit across the said control-cathode electrodes of both said silicon controlled rectifiers of said network which is connected across the corresponding phase of said supply potential, a source of direct current operating potential, an electrical relay having an operating coil and two normally open contacts, a switching transistor having base, emitter and collector electrodes, a silicon controlled rectifier having anode, cathode and control electrodes, means for connecting said relay operating coil, said collector-emitter electrodes of said switching transistor and said anode-cathode electrodes of said silicon controlled rectifier in series across said source of direct current operating potential, first and second trigger circuits each having a normally "on" control transistor having base, emitter and collector electrodes and a normally "off" follower transistor having base, emitter and collector electrodes connected across said source of direct current operating potential and being of the type which are transferrable from a stable state to an alternate state with the presence of a potential difference greater than a selected magnitude across the said emitter-base electrodes of said control transistor, first and second resistors, first and second diodes, means for connecting said first resistor and said first diode in series between said collector electrode of said follower transistor of said first trigger circuit and said base electrode of said switching transistor, means for connecting said second resistor and said second diode in series between said collector electrode of said follower transistor of said second trigger circuit and said base electrode of said switching transistor, a capacitor, third and fourth resistors, means for connecting said third resistor, said capacitor, and said fourth resistor in series between said collector electrode of said follower transistor of said first trigger circuit and said cathode electrode of said silicon controlled rectifier in that order, means for connecting said control electrode of said silicon controlled rectifier to a junction between said capacitor and said fourth resistor, a separate source of direct current potential, a source of direct current control potential of a magnitude proportional to the speed of said first motor, means for connecting a selected polarity terminal of said separate source of direct current potential to a like polarity terminal of said source of direct current control potential, a first potentiometer having a movable contact, means for connecting said first potentiometer across said separate source of direct current potential, means for connecting said movable contact of said first potentiometer to the said emitter electrodes of all of said transistors of said first and second trigger circuits, second and third potentiometers, means for connecting said second and third potentiometers in parallel across said source of direct current control potential, means for connecting said movable contact of one of said second and third potentiometers to the said base electrode of said control transistor of said first trigger circuit, means for connecting said movable contact of the other of said second and third potentiometers to the said base electrode of said control transistor and said second trigger circuit and means for connecting said relay contacts in series with said operating coil of said starting contactor and said source of energizing potential therefor.

References Cited

UNITED STATES PATENTS

| | | | |
|---|---|---|---|
| 3,345,549 | 10/1967 | Hauser | 318—227 |
| 3,422,329 | 1/1969 | Anderson | 318—103 |
| 3,426,529 | 2/1969 | Ziehm | 318—107 |

ORIS L. RADER, Primary Examiner

A. G. COLLINS, Assistant Examiner

U.S. Cl. X.R.

318—227

PO-1050
(5/69)

UNITED STATES PATENT OFFICE
CERTIFICATE OF CORRECTION

Patent No. 3,555,379          Dated January 12, 1971

Inventor(s) Donald E. Graham and Robert W. Leland

It is certified that error appears in the above-identified patent and that said Letters Patent are hereby corrected as shown below:

Col. 4, line 7, "designated" should read -- designed -- line 21, insert -- oppositely -- after "oppositely"; line 35, insert -- oppositely -- after "oppositely"; line 39, insert -- oppositely -- after "oppositely". Col. 7, line 43, "trigged" should read -- trigger --. Col. 12, line 9, insert a comma (,) after "winding"; line 51, "controll" should read -- control --. Col. 14, delete lines 14 and 15; after line 1 insert -- of said first trigger circuit, means for connecting said movable contact of the other of said second and third -- Col. 18, in the References Cited, "3,426,529" should read -- 3,426,259 --.

Signed and sealed this 22nd day of June 1971.

(SEAL)
Attest:

EDWARD M.FLETCHER,JR.          WILLIAM E. SCHUYLER, JR.
Attesting Officer          Commissioner of Patents